(12) United States Patent
Sang

(10) Patent No.: US 12,718,316 B2
(45) Date of Patent: Aug. 25, 2026

(54) UPDATING DISPLAY OF GAME MAP

(71) Applicant: TENCENT TECHNOLOGY (SHENZHEN) COMPANY LIMITED, Shenzhen (CN)

(72) Inventor: Qi Sang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 212 days.

(21) Appl. No.: 18/630,923

(22) Filed: Apr. 9, 2024

(65) Prior Publication Data

US 2024/0257298 A1 Aug. 1, 2024

Related U.S. Application Data

(63) Continuation of application No. 17/668,895, filed on Feb. 10, 2022, now Pat. No. 11,983,840, which is a continuation of application No. PCT/CN2020/123763, filed on Oct. 26, 2020.

(30) Foreign Application Priority Data

Jan. 17, 2020 (CN) ......................... 202010053597.1

(51) Int. Cl.
*G06T 3/20* (2006.01)
*G06T 3/40* (2006.01)
*G06T 17/05* (2011.01)

(52) U.S. Cl.
CPC .................. *G06T 3/20* (2013.01); *G06T 3/40* (2013.01); *G06T 17/05* (2013.01); *G06T 2200/24* (2013.01)

(58) Field of Classification Search
None
See application file for complete search history.

(56) References Cited

U.S. PATENT DOCUMENTS

2011/0130201 A1* 6/2011 Nojiri .................... A63F 13/42 463/31
2013/0083017 A1 4/2013 Fong et al.
2013/0328871 A1 12/2013 Piemonte et al.

(Continued)

FOREIGN PATENT DOCUMENTS

CN 101571403 A 11/2009
CN 104008162 A 8/2014

(Continued)

OTHER PUBLICATIONS

Boundfox Studios, "Weather & Season Manager in Unity | C# Tutorial | Part 1/2 | German," Bibliographic Information, YouTube, Aug. 2018, 2 pages.

(Continued)

*Primary Examiner* — Tapas Mazumder
(74) *Attorney, Agent, or Firm* — ArentFox Schiff LLP

(57) ABSTRACT

In a method for updating a game map, an update interval of a first map element to be displayed in the game map is determined based on a change frequency of the first map element. The first map element is displayed in the game map. The display of the first map element in the game map is updated based on the determined update interval of the first map element. Apparatus and non-transitory computer-readable storage medium counterpart embodiments are also contemplated.

20 Claims, 5 Drawing Sheets

(56) References Cited

U.S. PATENT DOCUMENTS

2019/0212900 A1 7/2019 Wang
2020/0179802 A1* 6/2020 Barki ...................... A63F 13/69
2020/0334887 A1* 10/2020 Salfity .................. G05D 1/0248

FOREIGN PATENT DOCUMENTS

CN 105957144 A 9/2016
CN 109745705 A 5/2019
CN 110047123 A 7/2019

OTHER PUBLICATIONS

Brackeys, "How to make a minimap in Unity," Bibliographic Information, YouTube, Sep. 2017, 2 pages.
Chidre's Tech Tutorials, "Unity Tags & Layers Manager | Introduction to Tags & Layers Manager in Unity—Unity Tutorial 9," Bibliographic Information, YouTube, Sep. 2018, 2 pages.
Design and Deploy, "Unity 5—How to Zoom Camera with Mouse Scroll Wheel," Bibliographic Information, YouTube, Jul. 2016, 2 pages.
International Search Report in PCT/CN2020/123763, mailed Jan. 27, 2021, 7 pages.
Office Action in EP20914042.5, mailed Oct. 14, 2022, 11 pages.
Unity Technologies, "Unity—Manual: Prefabs," The Wayback Machine, Dec. 2019, 3 pages.
Unity, "Cameras—Unity Official Tutorials," Bibliographic Information, YouTube, Apr. 2013, 2 pages.
Wood, Daniel, "Unity 2D Game Design Tutorial 7—Fix disappearing assets and using Sorting Layers," Bibliographic Information, YouTube, Oct. 2016, 2 pages.
Zhong, Qiu, "The Protract and Application of Vector Graphics Based on Visual C++," Computer Knowledge and Technology, Jun. 2011, vol. 7, No. 17, pp. 4099-4101.
Office Action received for Chinese Patent Application No. 202010053597.1, mailed on Mar. 31, 2025, 26 pages (17 pages of General Translation and 9 pages of Original Document).

* cited by examiner

UPDATING DISPLAY OF GAME MAP

RELATED APPLICATION

This application is a continuation of U.S. application Ser. No. 17/668,895, "METHOD AND APPARATUS FOR ADDING MAP ELEMENT, TERMINAL, AND STORAGE MEDIUM" and filed on Feb. 10, 2022, which is a continuation of International Application No. PCT/CN2020/123763, entitled "METHOD AND APPARATUS FOR ADDING MAP ELEMENT, TERMINAL, AND STORAGE MEDIUM" and filed on Oct. 26, 2020, which claims priority to Chinese patent application Ser. No. 202010053597.1, entitled "METHOD AND APPARATUS FOR ADDING MAP ELEMENT, TERMINAL, AND STORAGE MEDIUM" and filed on Jan. 17, 2020. The entire disclosures of the prior applications are incorporated herein by reference in their entirety.

FIELD OF THE TECHNOLOGY

This disclosure relates to the field of computer technologies, including a method and an apparatus for adding a map element, a terminal, and a storage medium.

BACKGROUND OF THE DISCLOSURE

With the development of computer technologies and the diversification of terminal functions, more and more types of games can be run on a terminal.

To perceive a position or the like in a virtual scene, many games start to provide a map function, which can provide a game player with prompts and convenience. For example, a game provides a map displayed in a virtual scene.

However, the development of a map requires a lot of labor. A display setting of each map element needs to be implemented through complex code writing, and a display logic of the map element is complex, resulting in relatively low development efficiency and high development complexity.

SUMMARY

Embodiments of this disclosure provide a method and an apparatus for adding a map element, a terminal, and a non-transitory computer-readable storage medium that can improve development efficiency and reduce development complexity.

According to an aspect, a method for adding a map element is provided. In the method a name of a layer to which a map element to be added by a target application program belongs, display follow information of the map element in the layer, and weather impact information of the map element are generated. A preform of the map element is generated in a target folder. Further, a code configured to update the map element is added by a target application program executed by processing circuitry. The code indicates a storage position of the preform of the map element and display state information of the map element being displayed in the layer.

According to an aspect, an apparatus is provided. The apparatus includes processing circuitry configured to generate a name of a layer to which a map element to be added by a target application program belongs, display follow information of the map element in the layer, and weather impact information of the map element. The processing circuitry is configured to generate a preform of the map element in a target folder. The processing circuitry is further configured to add a code configured to update the map element. The code indicates a storage position of the preform of the map element and display state information of the map element being displayed in the layer.

According to an aspect, a terminal is provided, the terminal including one or more processors and one or more memories, the one or more memories storing at least one piece of program code, the at least one piece of program code being loaded and executed by the one or more processors to implement the operations performed by any one of possible implementations of the method for adding a map element described above.

According to an aspect, a non-transitory computer-readable storage medium storing program code is provided. When executed by a processor the program code causes the processor to perform the method for adding a map element described above.

The technical solutions of the embodiments of this disclosure includes a novel development framework, in which classes required to implement some maps are encapsulated in a corresponding module in advance, so that during addition of a map element, a creation can be performed based on the existing classes in the module, thereby greatly improving development efficiency and avoiding development complexity.

BRIEF DESCRIPTION OF THE DRAWINGS

To describe the technical solutions in embodiments of this disclosure more clearly, the following briefly describes the accompanying drawings required for describing the embodiments. The accompanying drawings in the following descriptions show merely some embodiments of this disclosure, and a person of ordinary skill in the art may still derive other accompanying drawings from these accompanying drawings.

FIG. 1 is a schematic diagram of an implementation environment according to an embodiment of this disclosure.

DESCRIPTION OF EMBODIMENTS

Figure 2:
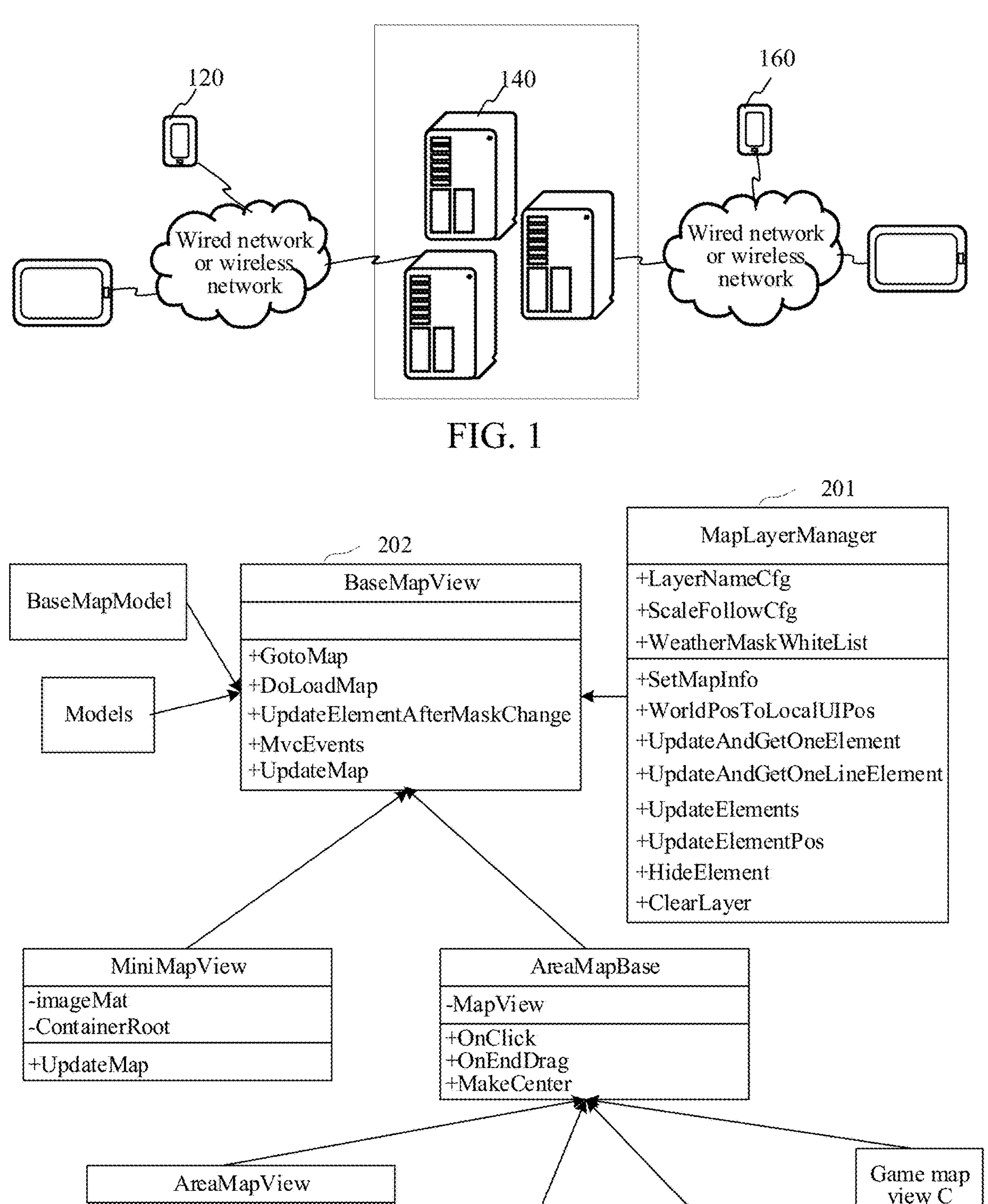
FIG. 2 is a class diagram of a map system according to an embodiment of this disclosure.

To make the objectives, technical solutions, and advantages of this disclosure clearer, the following further describes exemplary implementations of this disclosure in more detail with reference to the accompanying drawings.

Examples of the terms used in this disclosure are explained as follows.

A virtual scene is displayed (or provided) by an application program when run on a terminal.

In some embodiments, the virtual scene may be a simulated environment of a real world, may be a semi-simulated and semi-fictional virtual environment, or may be a completely fictional virtual environment.

In some embodiments, the virtual scene is any one of a two-dimensional virtual scene, a 2.5-dimensional virtual scene, or a three-dimensional virtual scene. A dimension of the virtual scene is not limited in the embodiments of this disclosure. For example, the virtual scene includes sky, land, ocean, or the like. The land includes an environmental element such as a desert and a city. A user controls a virtual object to move in the virtual scene.

A virtual object is a movable object in the virtual scene.

In some embodiments, the movable object is a virtual character, a virtual animal, a cartoon character, or the like, such as a character, an animal, a plant, an oil drum, a wall, or a stone displayed in a virtual scene. The virtual object is a virtual image for representing a user in the virtual scene. In some embodiments, the virtual scene includes a plurality of virtual objects, and each virtual object has a shape and a volume in the virtual scene, and occupies some space in the virtual scene.

In some embodiments, the virtual object is a player character controlled by an operation on a client, an artificial intelligence (AI) set in the virtual scene, or a non-player character (NPC) set in the virtual scene. In some embodiments, the AI set in the virtual scene is obtained through model training.

In some embodiments, the virtual object is a virtual character competing in the virtual scene.

In some embodiments, a quantity of virtual objects joining in interaction in the virtual scene is preset, or is dynamically determined according to a quantity of clients participating in the interaction.

A user interface (UI) design is an overall design of a human-computer interaction, an operation logic, and an interface of software.

A map system is a strategically indispensable part of a multiplayer online battle arena (MOBA) and a massive multiplayer online role-playing game (MMORPG), and is also one of the most frequently used functions by a player in a game. The map system is a set of a UI thumbnail of a game scene and some UI elements dynamically marking a key point position, and generally includes an area map (which is also called a big map) and a minimap (which is also called a mini-map). A player mainly observes an overall view of a game by using a map function. For example, in the MOBA, a player uses a map to clearly see the positions of creeps, defensive towers, terrains, monsters, and heroes on both sides. In another example, in the MMORPG, a player uses a map to see the position of the player or another player, to find an NPC, a monster and a teleporter.

The map element of the embodiments of this disclosure is any one display element in the virtual scene. In some embodiments, the map element includes a virtual object, a virtual item, and an environment element. A specific type of the map element is not limited in the embodiments of this disclosure.

Unity is an exemplary engine for rendering a three-dimensional interface.

Lua is an exemplary lightweight and small script language, written in standard C language and exposed as source code. The design objective of Lua is to be embedded into an application program, thereby providing flexible extended and customized functions.

FIG. 1 is a schematic diagram of an implementation environment according to an embodiment of this disclosure. Referring to FIG. 1, the implementation environment includes a first terminal 120, a server 140, and a second terminal 160.

An application program configured to support a virtual scene is installed and run on the first terminal 120. In some embodiments, the application program is any one of a first-person shooting game (FPS), a third-person shooting game, the MOBA, a virtual reality application program, a three-dimensional map program, a military simulation program, or a multiplayer gunfight survival game. The first terminal 120 is a terminal used by a first user, and the first user uses the first terminal 120 to operate a first virtual object located in the virtual scene to perform an action. The action includes, but is not limited to, at least one of adjusting body posture, crawling, walking, running, cycling, jumping, driving, picking-up, shooting, attacking, or throwing. Schematically, the first virtual object is a first virtual character such as a simulated character role or a cartoon character role.

The first terminal 120 and the second terminal 160 are connected to the server 140 by using a wireless network or a wired network.

The server 140 includes at least one of a server, a plurality of servers, a cloud computing platform, and a virtualization center. The server 140 is used for providing a backend service for the application program supporting the virtual scene. In some embodiments, the server 140 takes on primary computing work, and the first terminal 120 and the second terminal 160 take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application program supporting a virtual scene is installed and run on the second terminal 160. In some embodiments, the application program is any one of the FPS, the third-person shooting game, the MOBA, the virtual reality application program, the three-dimensional map program, the military simulation program, or the multiplayer gunfight survival game. The second terminal 160 is a terminal used by a second user. The second user uses the second terminal 160 to operate a second virtual object in the virtual scene to perform an action. The action includes, but is not limited to, at least one of adjusting body posture, crawling, walking, running, cycling, jumping, driving, picking-up, shooting, attacking, and throwing. For example, the second virtual object is a second virtual character such as a simulated character role or a cartoon character role.

In some embodiments, the first virtual object controlled by the first terminal 120 and the second virtual object controlled by the second terminal 160 are located in the same virtual scene. In this case, the first virtual object interacts with the second virtual object in the virtual scene.

In some embodiments, the first virtual object is hostile or adverse to the second virtual object, for example, the first virtual object and the second virtual object belong to different teams and different organizations, and the virtual objects in a hostile relationship fight against each other by shooting at each other on land.

In some embodiments, the application programs installed on the first terminal 120 and the second terminal 160 are the same, or the application programs installed on the two terminals are the same type of application programs in different control or operating system platforms. The first terminal 120 is generally one of a plurality of terminals, and the second terminal 160 is generally one of a plurality of terminals. In the embodiments of this disclosure, only the first terminal 120 and the second terminal 160 are used for description. The first terminal 120 and the second terminal 160 are of the same device type or of different device types. The device type includes at least one of a smartphone, a tablet computer, an e-book reader, a moving picture experts group audio layer III (MP3) player, a moving picture experts group audio layer IV (MP4) player, a portable laptop computer, a desktop computer, or the like. For example, the first terminal 120 and the second terminal 160 are the smartphones, or other handheld portable game devices. The following embodiment is described by using an example that the terminal is a smartphone.

A person skilled in the art should understand that there can be more or fewer terminals. For example, there is only one terminal, or there may be dozens of or hundreds of terminals or more. The quantity and the device type of the terminal are not limited in the embodiments of this disclosure.

In some embodiments, the method provided by the embodiments of this disclosure is applicable to a development terminal of a target application program. FIG. 2 is a class diagram of a map system according to an embodiment of this disclosure.

The map system of the target application program includes a map layer manager module (MapLayerManager) 201 and a base map view module (BaseMapView) 202. The map layer manager module 201 defines a layer name class (LayerNameCfg), a display follow class (ScaleFollowCfg), and a weather impact class (WeatherMaskWhiteList). The map layer manager module 201 is configured to manage a map size, a coordinate conversion, and an element layer, and also configured to manage whether an element zooms with a map, is affected by fog or extreme weather or the like. The map layer manager module 201 provides various interfaces for updating the map element, including a single coordinate point update, a double-point connection update, and a batch update.

The base map view module 202 defines an area map base class and a minimap base class, which is responsible for the functions of switching a map and loading and updating various map elements of the map. The base map view module 202 includes an area map base class submodule (AreaMapBase), and the area map base class submodule is configured to: invoke, in response to detecting a display state update operation of an area map, a corresponding function in the area map base class submodule according to an operation type of the display state update operation; and update a display of the area map by using the corresponding function in the area map base class submodule.

In some embodiments, the display state update operation includes zooming the map, dragging, clicking, automatically centering a map element, and refreshing the fog. However, the main function of the minimap base class submodule (MiniMapView) is moving a map to ensure that a leading role is in the center of the map when the leading role moves.

Figures 3, 4:
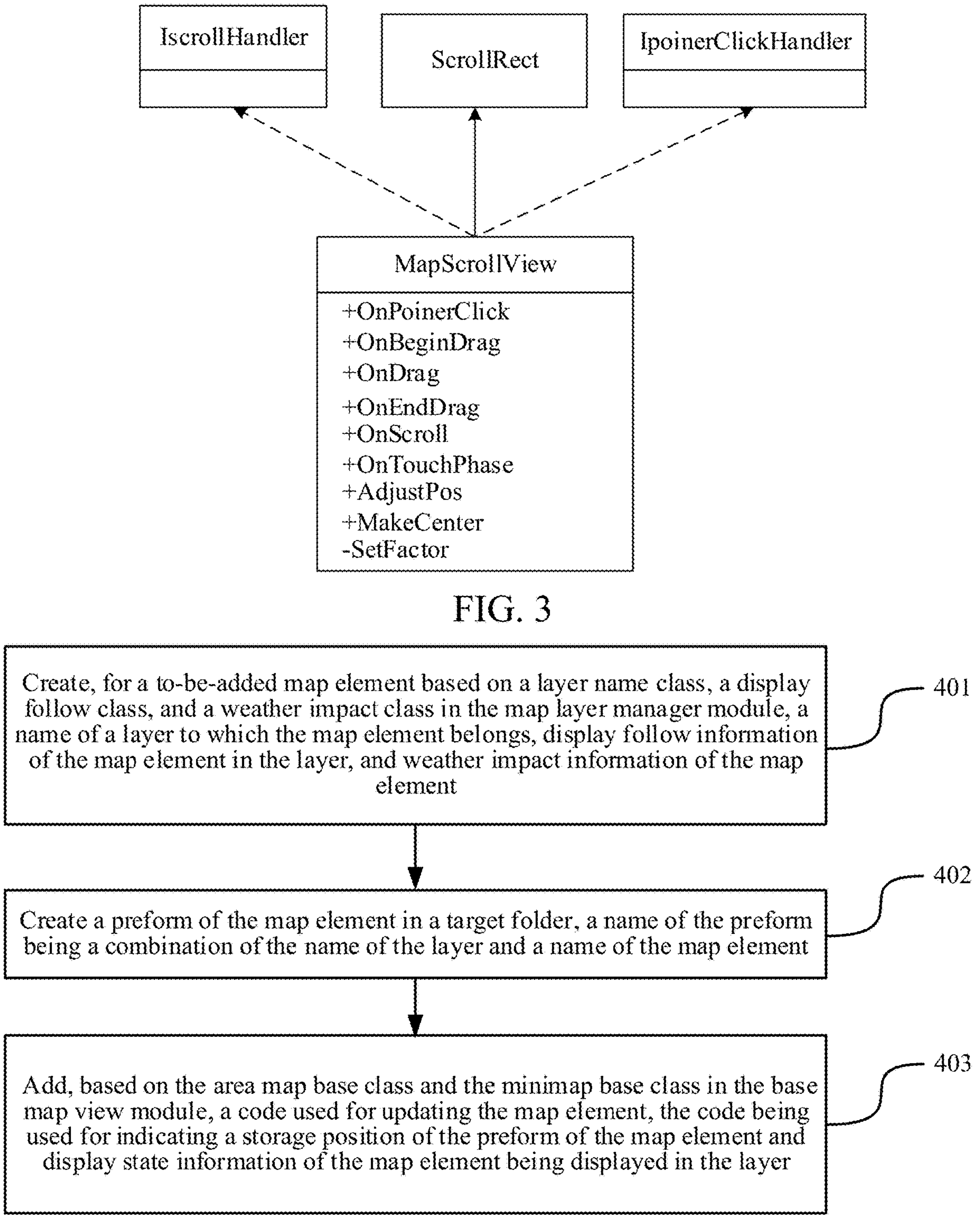
FIG. 3 is a schematic diagram of expanded components according to an embodiment of this disclosure.
FIG. 4 is a flowchart of a method for adding a map element according to an embodiment of this disclosure.

In some embodiments, to implement zoom and drag functions on the area map, the embodiments of this disclosure expand a zoom display function, a multi-touch function, and an automatic centering function on the area map, and rewrite drag and click interfaces, to form a MapScrollView component as shown in FIG. 3.

FIG. 4 is a flowchart of a method for adding a map element according to an embodiment of this disclosure. The method provided by the embodiments of this disclosure can be applied to a development terminal of a target application program. Referring to FIG. 4, the method can include the following steps.

In step 401, create, for a to-be-added map element based on the layer name class, the display follow class, and the weather impact class in the map layer manager module, a name of a layer to which the map element belongs, display follow information of the map element in the layer, and weather impact information of the map element.

The map element is any one of display elements or interaction elements. For example, for a newly added map element, a layer to which the map element belongs is defined based on existing classes, and is defined whether the map element zooms with the map, is affected by the weather, and the like.

In some embodiments, the display follow information is used for indicating whether the map element zooms with a map, and the weather impact information is used for indicating whether the map element is affected by a virtual weather in a virtual scene.

In step 402, create a preform of the map element in a target folder, a name of the preform being a combination of the name of the layer and a name of the map element.

The target folder corresponds to a storage path of the preform. In some embodiments, in the target folder, a preform may be created in a naming manner of layer+name. For example, the preform stores a game object, all components of the game object and all subgame objects of the object.

In step 403, add, based on the area map base class and the minimap base class in the base map view module, a code used for updating the map element, the code being used for indicating a storage position of the preform of the map element and display state information of the map element being displayed in the layer.

The code used for updating the map element is added by using step 403, so that the updated display of the map element may be implemented by using the code.

In some embodiments, the responding to the map element further has a special logic. For example, if a way finding function is clicked, a script may be added. The way finding function is a smart function in a game, by which a game object can be moved to a specific position through a fastest moving route.

The foregoing modules encapsulate various interfaces required for adding a new map element. Therefore, it is not necessary for a developer to consider the manner of implementing an internal function, to complete a related requirement with a minimal workload. A development time can be greatly reduced by adding the map element through the foregoing bottom layer structure.

In some embodiments, to reduce the computing amount of a processor and the frequency of recreating a canvas, the update frequency of the map element is reduced. Correspondingly, the method includes: setting an update interval of a display interface of the map to be longer than a display duration of two frames. For example, for an element that changes in real time, including the position of a specific object, for example, an object controlled by a terminal, the position of a teammate of the object, and an assassination target, update frame by frame is changed to update every two frames or update every N seconds. In some embodiments, the value of N is 0.2. In addition, every time the position really changes, the position of the map element may be re-rendered. That is, when the display position of the map element changes, display update is performed.

In some embodiments, to further reduce update frequency, it is determined based on the distance change degree of the map element between a first position and a second position whether to perform the display update. The first position is the position of the map element at a current moment, and the second position is the position of the map element at a previous moment. In some embodiments, it is determined based on a preset distance threshold whether to perform the display update. After the position of a target map element in the virtual scene at the current moment, according to the positions of the target map element at the current moment and the previous moment, the movement distance of the target map element is determined, and the movement distance is compared with the distance threshold. In response to the movement distance being greater than the distance threshold, a display update process is triggered. For example, when a movement distance of an element A reaches M meters, the display update is triggered. In some embodiments, the value of M is 2. The 2 meters is a distance measured with the coordinates of a virtual scene in the virtual scene rather than an actual distance in real life.

In some embodiments, for different map elements, different distance thresholds are set, so that a display update can be performed in time on a map element that has a relatively high display requirement and has a relatively huge impact on an overall scene. For the map element that has a relatively high display requirement and has a relatively large impact on an overall scene, a relatively small distance threshold is set to implement update in time. For a map element that has a relatively low display requirement and has a relatively small impact on the overall scene, a relatively large distance threshold is set, to ensure that an overall update frequency is reduced while some elements are updated in time. For example, for a first map element, if it is detected that the first map element is an element such as a treasure required for the object controlled by the terminal, the first map element is configured with a first distance threshold; and for a second map element, if it is detected that the second map element is an element such as an item already held by the object controlled by the terminal, the second map element is configured with a second distance threshold. The first distance threshold is less than the second distance threshold. Through the foregoing display update based on a distance, the update frequency and the rendering consumption of the map element can be greatly reduced, thereby improving overall performance.

In some embodiments, based on update characteristics of map elements, the map elements are classified into different element types. The element types include a map element that does not change after a map is loaded, for example, a teleporter; a map element that is updated based on an event, for example, a mission mark or a treasure mark; and an element that is updated in real time, for example, the position of an object controlled by the terminal, the position of a teammate of the object, and some specific map elements, a hawk eye mode target, airline information, survivable region restriction information. Based on the foregoing classification of element types, to determine whether to perform a display update, it is determined based on differences in element types whether to perform a display update. For example, in the process of displaying a minimap, for the map element that does not change after a map is loaded, a first update frequency is used for performing the display update. That is, the first update frequency is a relatively small update frequency. For the map element that is updated based on an event, the display update is performed only after the event is detected. For the element that is updated in real time, a second update frequency is used for performing the display update. The second update frequency is greater than the first update frequency. Through the foregoing update characteristics based on the map element, the display update used for distinguishing is performed, so that the update frequency and the rendering consumption of the map element can be greatly reduced, thereby improving overall performance.

In some embodiments, for different game modes, a display update manner that matches the game mode is set. For example, for a game mode of 20 vs 20, the position of a virtual object in the map element is updated in batches. The update in batches refers to that at a first moment, a display update is performed based on the position of a first group of virtual objects at the first moment, and at a next moment of the first moment, that is, a second moment, a display update is performed based on the position of a second group of virtual objects at the second moment, so that the amount of data that needs to be processed in every display update process is reduced, thereby improving overall performance.

In some embodiments, the map element on the map often appears or disappears. To avoid frequent loading and unloading of a map element causing a game to freeze, a memory pool is used for caching resources, which can avoid extra consumption caused by a SetActive (which is used for controlling display and hiding of a game object in Unity) and improve efficiency. The target application program loads a map element with a loading count reaching a count threshold into a memory pool, so that it is not necessary to reload the map element at every refresh.

In some embodiments, when the first map is switched to the second map, only partial map elements in the first map that is loaded in memory pool are cleared, while a repetitive map element in the first map and the second map is reserved, so that when the second map is loaded, reloading can be avoided, thereby improving a loading speed.

In some embodiments, there are various types of map elements, and tens of map elements may coexist. To reduce the rendering and invoking of a drawcall (a process in which a CPU prepares data and notifies a GPU in Unity is called a drawcall), picture resources of all map elements are stored in an atlas. All map elements are placed on one canvas, so that the map elements can generate only one drawcall. However, in this case, when the position of one map element changes, texture coordinates need to be recalculated for the entire canvas. Accordingly, dynamic and static separation is performed on the map elements. Map elements that change frequently are placed on one canvas, and map elements that change infrequently are placed on another canvas. A balance is reached between minimizing canvas reconstruction and minimizing a drawcall waste. That is, the target application program draws the first-class map element and the second-class map element on different canvases. The first-class map element is a map element with a change frequency greater than a target frequency threshold, and the second-class map element is a map element with a change frequency less than the target frequency threshold. In some embodiments, based on the update characteristics of the map elements, the map elements are classified into different element types, so that different types of map elements are drawn in layers.

Figures 5, 6:
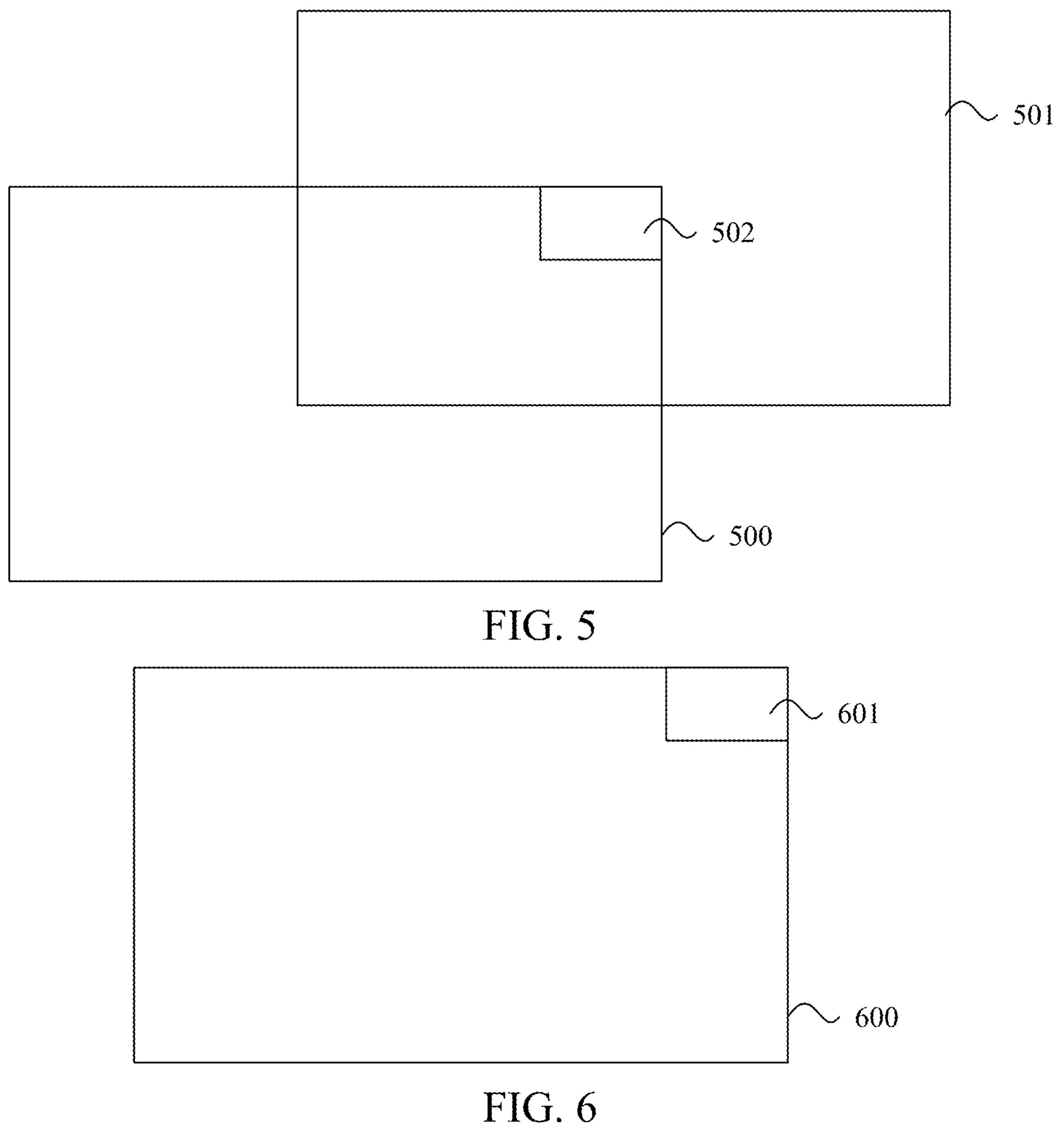
FIG. 5 is a schematic diagram of drawing a mask-based mini map according to an embodiment of this disclosure.
FIG. 6 is a schematic diagram of drawing a minimap that is performed texture cropping based on a shader according to an embodiment of this disclosure.

In some embodiments, the minimap (that is, a mini-map) is used for displaying a part of the area map (that is, a big map), which uses a mask method. When the mask method is used, the entire map needs to be drawn first, and is then displayed by cropping the part of the entire map through the mask. However, due to the large size of the map, the processing causes a serious overdraw problem, leading to a serious waste of computing resources. As shown in FIG. 5, a region inside a box 500 in FIG. 5 is a display area of the terminal. The box 501 is the entire drawn map, but a part determined by the box 502 is a final display part. Accordingly, the target application program may perform texture cropping to draw a minimap based on a shader, and a picture with a hollowed-out shape is superimposed on the minimap when the minimap is displayed. That is, the embodiments of this disclosure provide a dedicated shader for the base part of the minimap, which uses a manner of texture cropping to draw based on four vertices of a to-be-drawn part, thereby avoiding the overdraw problem.

Figure 7:
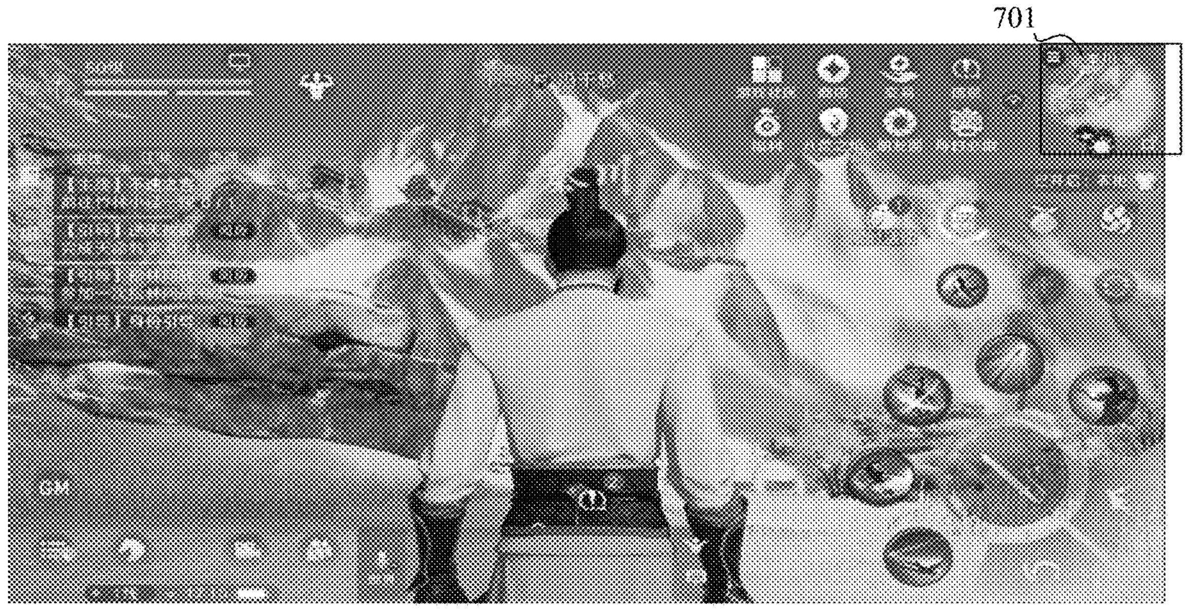
FIG. 7 is an effect diagram of displaying a minimap according to an embodiment of this disclosure.

As shown in FIG. 6, an area inside a box 600 in FIG. 6 is a display area of the terminal. A part determined by the box 601 is a drawing part, and a computing amount required for the drawing is greatly reduced. At the same time, a picture with a shape can be imported to perform hollowing on the shape. A final display effect of the hollowing is shown in a circular region framed by a box 701 in FIG. 7. That is, when the minimap is displayed, the terminal may use the manner of texture cropping to draw the base map based on the four vertices of the to-be-drawn part. A shape with a hollowed-out region is drawn in the upper layer of the base map based on the positions of the four vertices, so that the part of the base map corresponding to the hollowed-out region is observed by human eyes. For example, the hollowed-out region is a circular region. By drawing the displayed minimap in this way, a relatively smooth display can be implemented. In some embodiments, the hollowed-out region also has a gradient effect. That is, the transparency of the hollowed-out region is gradient, making the display effect soft and visually appealing and more suitable for a visual habit of human eyes.

The foregoing process introduces a method for drawing a base map of the minimap. In some embodiments, the following provides corresponding optimization methods for the drawing of a base map element in this drawing process. The optimization includes the following three optimization aspects:

1. Each map element is computed with a root node as a bounding box. A map element includes a plurality layers of UI nodes. In the embodiments of this disclosure, only the root node of the plurality layers of UI nodes is used as the bounding box to perform computing, to draw the map element. Compared with a computing method that requires traversal of parent nodes in the related art, the computing method can improve the flexibility of computing, ensure the display effect of the map element, and also greatly reduce the computing amount.
2. The relative coordinates of the UI node are used for computing intersectivity.
3. A special effect delete function is provided. That is, during drawing, the terminal can determine, according to the selection of a user, whether to display a special effect in the minimap. If the user sets that a special effect is to be displayed in the minimap, the special effects are also drawn when the map element is drawn. If the user sets that a special effect is not to be displayed in the minimap, because shader information corresponding to the special effect is written in the code in advance, the special effect is deleted by controlling a shader corresponding to the special effect. That is, the special effect is not drawn on the minimap. A RectMask2D component is improved based on the foregoing optimization methods, and the improved component is applied to map drawing, which can reduce a computing amount while reducing drawcalls, thereby improving overall performance. Experiments prove that, based on the foregoing optimization, the drawing consumption can be reduced by about 40%, thereby greatly improving the display performance of the terminal.

In some embodiments, the drawing of a large-size map element can be optimized. For example, for a map element whose size is larger than a preset size, a new color is obtained by mixing a new shader with a particular degree of transparency as a mixing factor and an existing color value in the map element, thereby implementing a relatively adequate display effect and avoiding a jagged display problem caused by the original cropping method.

In addition, frequent interactions between C# and Lua can also cause a significant amount of extra performance consumption. The most direct solution is to reduce the interactions between C# and Lua. In addition, when C# interacts with Lua, complex value types such as Vector 2 and Vector 3 unique to C# need to be noted additionally, which are value types on the C# side and become reference types on the Lua side. This causes extra memory allocation, and it is necessary to create a corresponding structure in advance, and then update the value in each frame of logic.

The embodiments of this disclosure provide a map implementation solution. The map system has a powerful function and higher expansibility, can improve use efficiency, has adequate performance, and is applicable to various MOBA games and MMORPG games.

Any combination of the foregoing exemplary technical solutions may be used to form an embodiment of this disclosure. Details are not described herein again.

Figure 8:
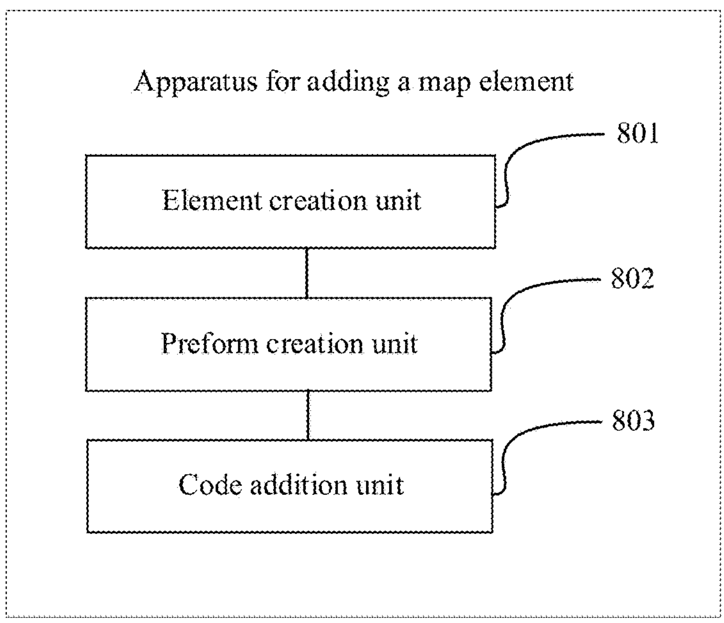
FIG. 8 is a schematic structural diagram of an apparatus for adding a map element according to an embodiment of this disclosure.

FIG. 8 is a schematic structural diagram of an apparatus for adding a map element according to an embodiment of this disclosure. The apparatus can be applied to a development terminal of a target application program. The target application program includes a map layer manager module and a base map view module. The map layer manager module defines a layer name class, a display follow class, and a weather impact class. The base map view module defines an area map base class and a minimap base class. Referring to FIG. 8, the apparatus can include an element creation unit 801, a preform creation unit 802, and a code addition unit 803. One or more units of the apparatus can be implemented by processing circuitry, software, or a combination thereof, for example.

The element creation unit 801 is configured to create, for a to-be-added map element based on the layer name class, the display follow class, and the weather impact class in the map layer manager module, a name of a layer to which the map element belongs, display follow information of the map element in the layer, and weather impact information of the map element.

The preform creation unit 802 is configured to create a preform of the map element in a target folder, a name of the preform being a combination of the name of the layer and a name of the map element.

The code addition unit 803 is configured to add a code used for updating the map element to the base map view module, the code being used for indicating a storage position of the preform of the map element and display state information of the map element being displayed in the layer.

In some embodiments, the display follow information is used for indicating whether the map element zooms with a map, and the weather impact information is used for indicating whether the map element is affected by a virtual weather in a virtual scene.

In some embodiments, the base map view module includes an area map base class submodule, and the area map base class submodule is configured to: invoke, in response to detecting a display state update operation of an area map, a corresponding function in the area map base class submodule according to an operation type of the display state update operation; and update a display of the area map by using the corresponding function in the area map base class submodule.

In some embodiments, the area map base class submodule is configured to:

invoke a zoom function in the area map base class submodule in response to that the display state update operation is a zoom operation;

invoke a position movement function in the area map base class submodule in response to that the display state update operation is a drag operation; or invoke an automatic centering function in the area map base class submodule in response to that the display state update operation is an automatic centering operation.

In some embodiments, a first-class map element and a second-class map element of the target application program are respectively drawn in different canvases, the first-class map element is a map element with a change frequency greater than a target frequency threshold, and the second-class map element is a map element with a change frequency less than the target frequency threshold.

In some embodiments, an update interval of a display interface of the target application program is longer than a display duration of two frames.

In some embodiments, the target application program performs a display update in response to detecting a change in a display position of the map element.

In some embodiments, the target application program loads a map element with a loading count reaching a count threshold into a memory pool.

In some embodiments, the target application program may perform texture cropping to draw a minimap based on a shader, and a picture with a hollowed-out shape is superimposed on the minimap when the minimap is displayed.

In some embodiments, the target application program expands at least one of a zoom display function, a multi-touch function or an automatic centering function on the area map, and a three-dimensional engine of the target application program includes a component having the at least one function.

In some embodiments, the target application program performs a display update according to a distance change degree of the map element between a first position and a second position in a virtual scene, the first position is a position of the map element in the virtual scene at a current moment, and the second position is a position of the map element in the virtual scene at a previous moment.

In some embodiments, the performing, by the target application program, a display update according to a distance change degree of the map element between a first position and a second position in a virtual scene includes:

determining, by the target application program, a movement distance of the map element between the current moment and the previous moment according to the first position and the second position; and performing, by the target application program, the display update in response to that the movement distance is greater than a distance threshold.

In some embodiments, different map elements correspond to different distance thresholds.

In some embodiments, an element type of the map element includes a map element that does not change after a map is loaded, a map element that is updated based on an event, and an element that is updated in real time.

Any combination of the foregoing exemplary technical solutions may be used to form an embodiment of this disclosure. Details are not described herein again.

When the apparatus for adding a map element provided in the foregoing embodiments adds a map element, the division of the foregoing functional modules is merely an example for description. In a practical application, the functions may be assigned to and completed by different functional modules according to the requirements, that is, the internal structure of a terminal is divided into different functional modules, to implement all or some of the functions described above. In addition, the embodiments of the apparatus and method for adding a map element provided in the foregoing embodiments belong to one conception. For the specific implementation process, reference may be made to the embodiments of the method for adding a map element, and details are not described herein again.

Figure 9:
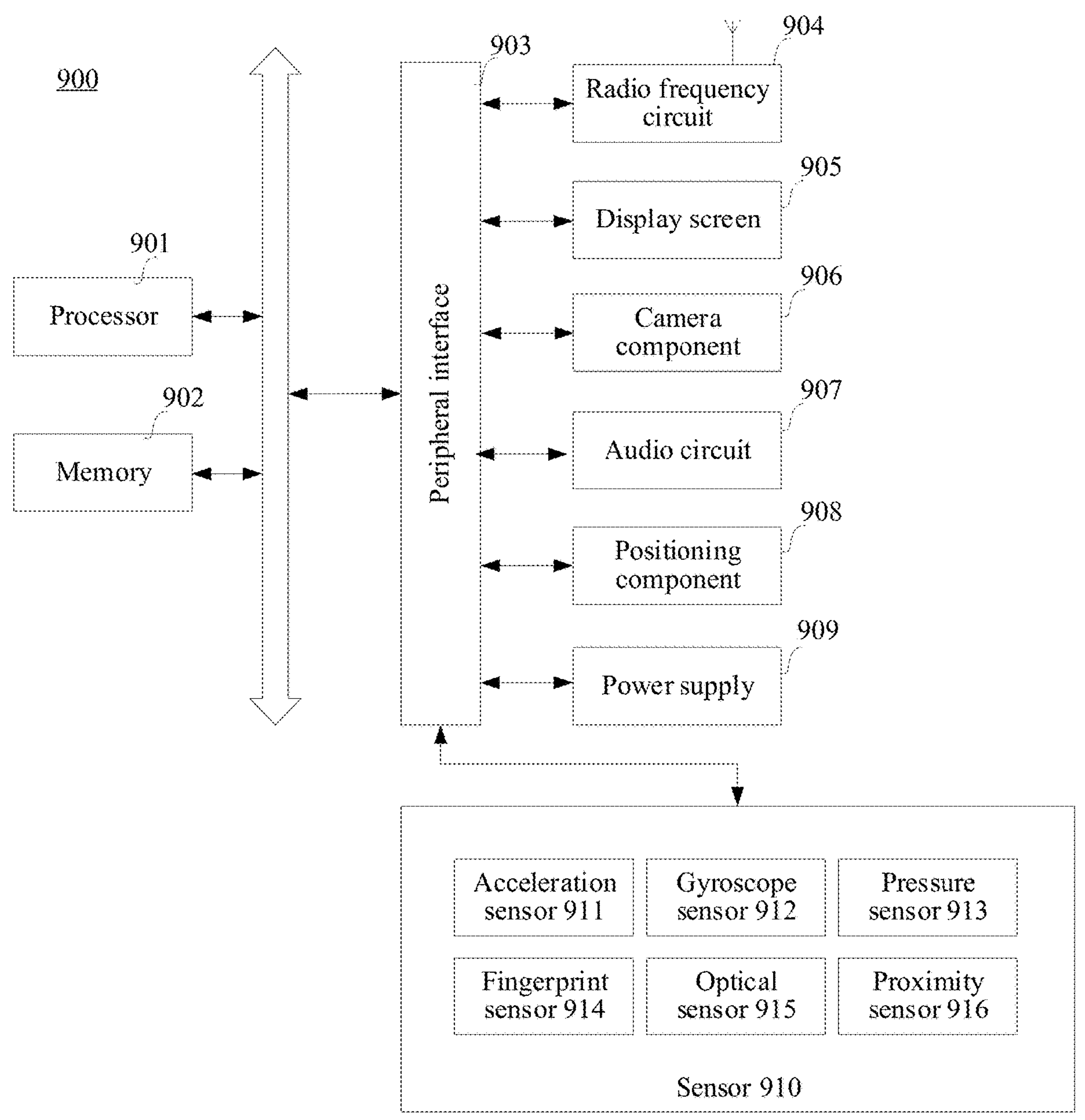
FIG. 9 is a schematic structural diagram of a terminal according to an embodiment of this disclosure.

FIG. 9 is a schematic structural diagram of a terminal according to an embodiment of this disclosure. In some embodiments, the terminal 900 includes a smartphone, a tablet computer, an MP3 player, an MP4 player, a notebook computer, or a desktop computer. The terminal 900 may also be referred to as a user device, a portable terminal, a laptop terminal, a desktop terminal or the like.

Generally, the terminal 900 includes processing circuitry, such as a processor 901, and a memory 902.

The processor 901 includes one or more processing cores, for example, a 4-core processor or an 8-core processor. The processor 901 may be implemented by at least one hardware form of a digital signal processor (DSP), a field-programmable gate array (FPGA), and a programmable logic array (PLA). The processor 901 alternatively include a main processor and a coprocessor. The main processor is configured to process data in an active state, also referred to as a central processing unit (CPU). The coprocessor is a low-power processor configured to process data in a standby state. In some embodiments, the processor 901 may be integrated with a graphics processing unit (GPU). The GPU is used for rendering and drawing content that needs to be displayed in a display. In some embodiments, the processor 901 further include an AI processor. The AI processor is configured to process a computing operation related to machine learning.

The memory 902 include one or more computer-readable storage media. The computer-readable storage medium may be non-transient. The memory 902 further include a high-speed random access memory and a non-volatile memory, such as one or more magnetic disk storage devices or a flash storage device. In some embodiments, the non-transitory computer-readable storage medium in the memory 902 is configured to store at least one piece of program code, and the at least one piece of program code is configured to be executed by the processor 901 to implement the method for adding a map element provided in the embodiments of this disclosure.

In some embodiments, the terminal 900 may include: a peripheral interface 903 and at least one peripheral. The processor 901, the memory 902, and the peripheral interface 903 are connected by using a bus or a signal cable. Each peripheral is connected to the peripheral interface 903 through a bus, a signal cable, or a circuit board. In some embodiments, the peripheral includes: at least one of a radio frequency (RF) circuit 904, a display screen 905, a camera component 906, an audio circuit 907, a positioning component 908, and a power supply 909.

The peripheral interface 903 is configured to connect at least one peripheral related to input/output (I/O) to the processor 901 and the memory 902. In some embodiments, the processor 901, the memory 902, and the peripheral interface 903 are integrated on the same chip or circuit board. In some other embodiments, any one or two of the processor 901, the memory 902, and the peripheral interface 903 is implemented on an independent chip or circuit board. This is not limited in the embodiments of this disclosure.

The radio frequency circuit 904 is used for receiving and transmitting a radio frequency (RF) signal, which is also referred to as an electromagnetic signal. The RF circuit 904 communicates with a communication network and other communication devices through the electromagnetic signal. The RF circuit 904 converts an electrical signal into an electromagnetic signal for transmission, or converts a received electromagnetic signal into an electrical signal. In some embodiments, the RF circuit 904 includes: an antenna system, an RF transceiver, one or more amplifiers, a tuner, an oscillator, a digital signal processor, a codec chip set, a subscriber identity module card, and the like. The RF circuit 904 communicates with other terminals by using at least one wireless communication protocol. The wireless communication protocol includes, but is not limited to, a metropolitan area network, generations for mobile communication networks (2G, 3G, 4G, and 5G), a wireless partial area network, and/or a Wi-Fi network. In some embodiments, the RF circuit 904 further includes a circuit related to near field communication (NFC), which is not limited in this disclosure.

The display screen 905 is used for displaying a UI. The UI includes a graph, a text, an icon, a video, and any combination thereof. When the display screen 905 is a touch display screen, the display screen 905 is further capable of collecting a touch signal on or above a surface of the display screen 905. The touch signal may be used as a control signal to be inputted to the processor 901 for processing. In this case, the display screen 905 is further configured to provide a virtual button and/or a virtual keyboard that are/is also referred to as a soft button and/or a soft keyboard. In some embodiments, there may be one display screen 905 disposed on a front panel of the terminal 900. In some other embodiments, there are at least two display screens 905 respectively disposed on different surfaces of the terminal 900 or designed in a foldable shape. In some other embodiments, the display screen 905 is a flexible display screen, disposed on a curved surface or a folded surface of the terminal 900. Even, the display screen 905 can be further set to have a non-rectangular irregular pattern, that is, a special-shaped screen. The display screen 905 is manufactured by using a material such as a liquid crystal display (LCD) or an organic light-emitting diode (OLED).

The camera component 906 is configured to collect images or videos. In some embodiments, the camera component 906 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In some embodiments, the camera 906 further includes a flash. The flash may be single-color-temperature flash, or may be a double-color-temperature flash. The double-color-temperature flash refers to a combination of a warm-light flash and a cold-light flash, and is used for light compensation under different color temperatures.

The audio circuit 907 includes a microphone and a loudspeaker. The microphone is used for collecting sound waves of users and surroundings, and convert the sound waves into electrical signals and input the signals to the processor 901 for processing, or input the signals to the RF circuit 904 to implement voice communication. For the purpose of stereo collection or noise reduction, there are a plurality of microphones, respectively disposed at different portions of the terminal 900. The microphone is further an array microphone or an omni-directional acquisition type microphone. The speaker is used for converting electrical signals from the processor 901 or the RF circuit 904 into acoustic waves. The loudspeaker is a thin-film loudspeaker or a piezoelectric ceramic loudspeaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 907 also includes an earphone jack.

The positioning component 908 is configured to determine a current geographic location of the terminal 900, to implement navigation or a location based service (LBS). The positioning component 908 is a positioning component based on a global positioning system (GPS) of the United States, a COMPASS System of China, a GLONASS System of Russia, or a GALILEO System of the European Union.

The power supply 909 is configured to supply power to components in the terminal 900. The power supply 909 is an alternating current, a direct current, a disposable battery, or a rechargeable battery. When the power source 909 includes the rechargeable battery, the rechargeable battery is a wired rechargeable battery or a wireless rechargeable battery. The rechargeable battery is further used for supporting a quick charge technology.

In some embodiments, the terminal 900 may also include one or more sensors 910. The one or more sensors 910 include, but are not limited to, an acceleration sensor 911, a gyroscope sensor 912, a pressure sensor 913, a fingerprint sensor 914, an optical sensor 915, and a proximity sensor 916.

The acceleration sensor 911 detects a magnitude of acceleration on three coordinate axes of a coordinate system established by the terminal 900. For example, the acceleration sensor 911 is used for detecting components for gravity acceleration on the three coordinate axes. The processor 901 controls, according to a gravity acceleration signal collected by the acceleration sensor 911, the display screen 905 to display the UI in a landscape view or a portrait view. The acceleration sensor 911 is further used for acquiring motion data of a game or a user.

The gyroscope sensor 912 detects a body direction and a rotation angle of the terminal 900, and works with the acceleration sensor 911 to acquire a 3D action performed by the user on the terminal 900. The processor 901 implements the following functions according to the data collected by the gyroscope sensor 912: motion sensing (such as changing the UI according to a tilt operation of the user), image stabilization during shooting, game control, and inertial navigation.

The pressure sensor 913 is disposed on a side frame of the terminal 900 and/or a lower layer of the display screen 905. When the pressure sensor 913 is disposed at the side frame of the terminal 900, a holding signal of the user on the terminal 900 is detected. The processor 901 performs left/right hand recognition or a quick operation according to the holding signal collected by the pressure sensor 913. When the pressure sensor 913 is disposed on the lower layer of the display screen 905, the processor 901 controls, according to a pressure operation of the user on the display screen 905, an operable control on the UI. The operable control includes at least one of a button control, a scroll-bar control, an icon control, and a menu control.

The fingerprint sensor 914 is configured to collect a fingerprint of the user, and the processor 901 recognizes an identity of the user according to the fingerprint collected by the fingerprint sensor 914, or the fingerprint sensor 914 recognizes the identity of the user according to the collected fingerprint. When the identity of the user is recognized as credible, the processor 901 authorizes the user to perform a related sensitive operation. The sensitive operation includes unlocking a screen, viewing encrypted information, downloading software, paying, changing a setting, and the like. The fingerprint sensor 914 is disposed on a front face, a back face, or a side face of the terminal 900. When a physical button or a vendor logo is disposed on the terminal 900, the fingerprint sensor 914 is integrated together with the physical button or the vendor logo.

The optical sensor 915 is configured to acquire ambient light intensity. In some embodiments, the processor 901 controls display brightness of the display screen 905 according to the ambient light intensity collected by the optical sensor 915. When the ambient light intensity is relatively high, the display brightness of the display screen 905 is increased. When the ambient light intensity is relatively low, the display brightness of the display screen 905 is decreased. In another embodiment, the processor 901 may further dynamically adjust a camera parameter of the camera 906 according to the ambient light intensity acquired by the optical sensor 915.

The proximity sensor 916, also referred to as a distance sensor, is generally disposed on the front panel of the terminal 900. The proximity sensor 916 is configured to collect a distance between the user and the front face of the terminal 900. In an embodiment, when the proximity sensor 916 detects that the distance between the user and the front surface of the terminal 900 gradually becomes smaller, the touch display screen 905 is controlled by the processor 901 to switch from a screen-on state to a screen-off state. When the proximity sensor 916 detects that the distance between the user and the front surface of the terminal 900 gradually becomes larger, the touch display screen 905 is controlled by the processor 901 to switch from the screen-off state to the screen-on state.

A person skilled in the art may understand that the structure shown in FIG. 9 does not constitute a limitation to the terminal 900, and the terminal 900 may include more components or fewer components than those shown in the figure, or some components may be combined, or a different component deployment may be used.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an exemplary embodiment, a computer-readable storage medium (e.g., non-transitory computer-readable storage medium) is further provided, such as a memory including instructions, where the foregoing instructions may be executed by a processor in a terminal to complete the method for adding a map element in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the operations of the foregoing embodiments may be implemented by using hardware, or may be implemented by a program instructing relevant hardware. The program may be stored in a computer-readable storage medium. The above-mentioned storage medium may be a ROM, a magnetic disk, an optical disc, or the like.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for updating a game map, the method comprising:

determining an update interval of a first map element to be displayed in the game map based on a change frequency of the first map element;

determining a classification of the first map element based on the change frequency of the first map element, the classification of the first map element being a first classification when the change frequency of the first map element is greater than or equal to a change frequency threshold, and the classification of the first map element being a second classification when the change frequency of the first map element is less than the change frequency threshold;

when the classification of the first map element is a first classification, adding the first map element to a first canvas of the game map;

when the classification of the first map element is a second classification, adding the first map element to a second canvas of the game map;

displaying the first map element in the game map; and updating the display of the first map element in the game map based on the determined update interval of the first map element.

2. The method according to claim 1, further comprising:

determining an update interval of a second map element to be displayed in the game map based on a change frequency of the second map element;

displaying the second map element in the game map; and updating the display of the second map element in the game map based on the determined update interval of the second map element, wherein the update interval of the second map element is different from the update interval of the first map element.

3. The method according to claim 1, further comprising: determining a classification of a second map element to be displayed in the game map is the second classification based on a change frequency of the second map element; and adding the second map element to the second canvas based on the classification of the second map element being the second classification, wherein the classification of the first map element is the first classification.

4. The method according to claim 1, wherein a minimum update interval of the game map is longer than a display duration of two frames.

5. The method according to claim 1, further comprising: detecting a change in a display position of the first map element; and updating the display of the first map element in the game map based on the detected change in the display position of the first map element.

6. The method according to claim 5, wherein the updating the display of the first map element comprises:

updating the display of the first map element in the game map based on the detected change in the display position of the first map element being greater than or equal to a distance threshold.

7. The method according to claim 6, wherein the game map includes a second map element, and the distance threshold for the first map element is different from a distance threshold for the second map element.

8. The method according to claim 1, wherein the first map element is loaded in a memory pool when a loading count of the first map element reaches a count threshold.

9. The method according to claim 1, wherein the determining the classification of the first map element comprises:

determining the classification of the first map element based on an element type of the first map element, the element type indicating that an associated map element does not change after the game map is loaded, the associated map element is updated based on an event, or the associated map element is updated in real time.

10. An apparatus, comprising:

processing circuitry configured to:

determine an update interval of a first map element to be displayed in a game map based on a change frequency of the first map element;

determine a classification of the first map element based on the change frequency of the first map element, the classification of the first map element being a first classification when the change frequency of the first map element is greater than or equal to a change frequency threshold, and the classification of the first map element being a second classification when the change frequency of the first map element is less than the change frequency threshold;

when the classification of the first map element is a first classification, add the first map element to a first canvas of the game map;

when the classification of the first map element is a second classification, add the first map element to a second canvas of the game map;

display the first map element in the game map; and update the display of the first map element in the game map based on the determined update interval of the first map element.

11. The apparatus according to claim 10, wherein the processing circuitry is configured to:

determine an update interval of a second map element to be displayed in the game map based on a change frequency of the second map element;

display the second map element in the game map; and update the display of the second map element in the game map based on the determined update interval of the second map element, wherein the update interval of the second map element is different from the update interval of the first map element.

12. The apparatus according to claim 11, wherein the processing circuitry is configured to:

determine a classification of a second map element to be displayed in the game map is the second classification based on a change frequency of the second map element; and add the second map element to the second canvas based on the classification of the second map element being the second classification, and the classification of the first map element is the first classification.

13. The apparatus according to claim 10, wherein a minimum update interval of the game map is longer than a display duration of two frames.

14. The apparatus according to claim 10, wherein the processing circuitry is configured to:

detect a change in a display position of the first map element; and update the display of the first map element in the game map based on the detected change in the display position of the first map element.

15. The apparatus according to claim 14, wherein the processing circuitry is configured to:

update the display of the first map element in the game map based on the detected change in the display position of the first map element being greater than or equal to a distance threshold.

16. The apparatus according to claim 15, wherein the game map includes a second map element, and the distance threshold for the first map element is different from a distance threshold for the second map element.

17. The apparatus according to claim 10, wherein the first map element is loaded in a memory pool when a loading count of the first map element reaches a count threshold.

18. A non-transitory computer-readable storage medium storing program instructions which, when executed by a processor, cause the processor to perform a method for updating a game map, the method comprising:

determining an update interval of a first map element to be displayed in a game map based on a change frequency of the first map element;

determining a classification of the first map element based on the change frequency of the first map element, the classification of the first map element being a first classification when the change frequency of the first map element is greater than or equal to a change frequency threshold, and the classification of the first map element being a second classification when the change frequency of the first map element is less than the change frequency threshold;

when the classification of the first map element is a first classification, adding the first map element to a first canvas of the game map;

when the classification of the first map element is a second classification, adding the first map element to a second canvas of the game map;

displaying the first map element in the game map; and updating the display of the first map element in the game map based on the determined update interval of the first map element.

19. The non-transitory computer-readable storage medium according to claim 18, wherein the method comprises:

determining a classification of a second map element to be displayed in the game map is the second classification based on a change frequency of the second map element; and adding the second map element to the second canvas based on the classification of the second map element being the second classification, and the classification of the first map element is the first classification.

20. The non-transitory computer-readable storage medium according to claim 18, wherein a minimum update interval of the game map is longer than a display duration of two frames.

* * * * *